(12) United States Patent
Pisharodi (10) Patent No.: US 8,598,850 B2
(45) Date of Patent: Dec. 3, 2013

(54) DEVICES AND METHODS FOR OPTIMIZING RECHARGEABLE BATTERY LIFE

(75) Inventor: Madhavan Pisharodi, Brownsville, TX (US)

(73) Assignee: Perumala Corporation, Brownsville, TX (US)

( * ) Notice: Subject to any disclaimer, the term of this patent is extended or adjusted under 35 U.S.C. 154(b) by 0 days.

(21) Appl. No.: 13/590,896

(22) Filed: Aug. 21, 2012

(65) Prior Publication Data

US 2013/0049701 A1   Feb. 28, 2013

Related U.S. Application Data

(63) Continuation-in-part of application No. 13/199,429, filed on Aug. 30, 2011.

(51) Int. Cl.
*H02J 7/04* (2006.01)
*H02J 7/16* (2006.01)

(52) U.S. Cl.
USPC .......................................... 320/148; 320/155

(58) Field of Classification Search
USPC ......................................................... 320/148
See application file for complete search history.

(56) References Cited

U.S. PATENT DOCUMENTS

| | | |
|---|---|---|
| 3,855,516 A | 12/1974 | Fairchild |
| 4,289,836 A | 9/1981 | Lemelson |
| 4,302,714 A | 11/1981 | Yefsky |
| 4,668,902 A | 5/1987 | Zeller, Jr. |
| 4,829,226 A | 5/1989 | Nakamura |
| 5,075,614 A | 12/1991 | Whiting |
| 5,179,335 A | 1/1993 | Nor |
| 5,283,511 A | 2/1994 | Keener |
| 5,497,067 A | 3/1996 | Shaw |
| 5,554,920 A * | 9/1996 | Kokuga .................... 320/148 |
| 5,592,070 A | 1/1997 | Mino |
| 5,627,882 A | 5/1997 | Chien |
| 5,637,979 A | 6/1997 | Tamai |
| 5,936,385 A | 8/1999 | Patillon |
| 6,043,631 A | 3/2000 | Tsenter |
| 6,326,767 B1 | 12/2001 | Small |
| 6,614,206 B1 * | 9/2003 | Wong et al. .............. 320/136 |
| 6,617,827 B2 | 9/2003 | Knish |
| 6,909,259 B2 * | 6/2005 | Chung ...................... 320/107 |
| 6,956,353 B1 | 10/2005 | Klitzner |
| 6,975,095 B2 * | 12/2005 | Ooi et al. ................. 320/132 |
| 7,111,179 B1 | 9/2006 | Girson |
| RE42,385 E * | 5/2011 | Wong et al. .............. 320/136 |
| 8,188,713 B2 * | 5/2012 | Lee .......................... 320/111 |

(Continued)

OTHER PUBLICATIONS

Search report and written opinion dated Nov. 15, 2012 for co-pending PCT patent app. No. PCT/US2012/052797.

(Continued)

*Primary Examiner* — Arun Williams
(74) *Attorney, Agent, or Firm* — D'Ambrosio & Menon, PLLC; Usha Menon (57) ABSTRACT

Embodiments of the present invention generally comprise devices and methods for optimizing rechargeable battery life. One or more embodiments of the invention comprise a device for interrupting the charging status of a rechargeable battery, comprising: a plug, an outlet, a switch, and a controller for controlling the switch state dependent on at least one of: amount of time the switch is in the open state, and amount of time the switch is in the closed state.

28 Claims, 12 Drawing Sheets

(56) References Cited

U.S. PATENT DOCUMENTS

| | | |
|---|---|---|
| 2004/0066171 A1 | 4/2004 | Mori |
| 2005/0085180 A1* | 4/2005 | Ballay et al. .................... 455/1 |
| 2005/0266301 A1 | 12/2005 | Smith et al. |
| 2006/0209637 A1* | 9/2006 | May et al. .................... 368/223 |
| 2006/0267549 A1* | 11/2006 | Kung .......................... 320/111 |
| 2007/0070822 A1* | 3/2007 | Booty et al. ................. 368/223 |
| 2007/0216353 A1* | 9/2007 | Fischer et al. ................ 320/115 |
| 2007/0300180 A1* | 12/2007 | Hama et al. .................. 715/787 |
| 2008/0185990 A1* | 8/2008 | Hsu ............................. 320/103 |
| 2008/0290839 A1 | 11/2008 | Hayashi |
| 2008/0296975 A1 | 12/2008 | Shakespeare et al. |
| 2009/0158188 A1* | 6/2009 | Bray et al. ................... 715/771 |
| 2009/0179615 A1 | 7/2009 | Amron |
| 2010/0148729 A1 | 6/2010 | Johnson et al. |
| 2010/0188043 A1 | 7/2010 | Kelty |
| 2010/0213892 A1* | 8/2010 | DeSanctis .................... 320/107 |
| 2010/0289456 A1 | 11/2010 | Veselic et al. |
| 2011/0227535 A1* | 9/2011 | Caskey et al. ................ 320/111 |
| 2011/0279080 A1* | 11/2011 | Fischer et al. ................ 320/107 |

OTHER PUBLICATIONS

"Environplug- Mobile Phone Energy Saving Adapter;" Nov. 15, 2010; http://www.envirogadget.com/office-eco-gadgets/enviroplug-mobile-phone-energy-saving-adapter/.

"Eco Charger with Apple Compatible Adapter for Cell Phone by Volt Star;" Sep. 27, 2010; http://www.envirogadget.com/energy-saving/eco-charger-with-apple-compatible-adapter-for-cell-phone-by-volt-star/.

* cited by examiner

DEVICES AND METHODS FOR OPTIMIZING RECHARGEABLE BATTERY LIFE

PRIORITY CLAIM

This application is a continuation-in-part of and claims priority to U.S. Ser. No. 13/199,429 filed Aug. 30, 2011, the contents of which are incorporated by reference herein.

FIELD OF THE INVENTION

The invention relates generally to devices and methods for optimizing the life of a rechargeable battery, and more particularly, to devices and methods for charging and/or discharging a rechargeable battery on time-dependent bases.

BACKGROUND

Almost every type of rechargeable battery (lead-acid, nickel-cadmium, nickel-metal hydride, lithium, etc.) can be damaged and/or its operating capacity can be reduced by what is often referred to as overcharging. Many such devices, the chargers for such batteries, and sometimes even the batteries themselves, are provided with indicator lights or other alerts to inform the user that the battery is fully charged, prompting a user that the device or battery should be removed from the charger once charging is complete. Further, the instruction manuals of almost every such device include warnings, some of them prominent, that the device not be overcharged and/or that the device should be removed from the charger or power source when the charge indicator appears.

In actual practice, however, the users of devices that are powered by rechargeable batteries tend to leave the battery, or the device including the battery, on the charger or connected to a power source from the time charging starts until the device or battery is unplugged for subsequent use. As a result, the battery is often left on the charger and/or the device including the battery stays connected to a power source for many hours longer than needed to recharge the battery (newly-developed battery technology has produced batteries that charge in minutes rather than hours with the result that the battery and/or device stays on the charger far longer than necessary), despite the prominent warnings against overcharging.

SUMMARY

Embodiments of the present invention generally comprise devices and methods for optimizing rechargeable battery life.

One or more embodiments of the invention comprise a device for interrupting the charging status of a rechargeable battery. The charge-interrupting device may comprise a plug for connecting to a power source; an outlet for receiving a plug capable of transferring power to the rechargeable battery; a switch configured to selectively be in either a closed state or an open state; and a controller for controlling the switch state.

The plug of the charge-interrupting device may be connected to a power source, and a plug capable of transferring power to the rechargeable battery may be connected to the outlet of the charge-interrupting device. Such an arrangement may allow for electrical communication between the power source and the rechargeable battery.

The switch state may determine whether the rechargeable battery will be in a charging state or a discharging state. For example, while the switch is in the closed state, electricity may flow from the power source to downstream of the switch. Conversely, while the switch is in the open state, electricity may not flow from the power source to downstream of the switch. Because the rechargeable battery may be disposed in electrical communication with, and downstream of the switch, the rechargeable battery may charge or discharge depending on whether the switch in a closed state or an open state, respectively.

Further, the controller may control the switch state, and the switch state may be dependent on at least one of: amount of time the switch is in the open state, and amount of time the switch is in the closed state.

The outlet of the charge-interrupting device may be configured to receive a plug type comprising at least one of: 2-prong plug, 3-prong plug, USB connector, micro USB connector, and 30-pin connector or a similar type of connector. The plug of the charge-interrupting device may comprise at least one of: 2-prong plug, 3-prong plug, USB connector, micro USB connector, and 30-pin connector.

In one or more embodiments, the charge-interrupting device outlet may be configured to receive a USB connector, and the charge-interrupting device plug may comprise at least one of a 2-prong plug and a 3-prong plug. In one or more other embodiments, the charge-interrupting device outlet may be configured to receive at least one of a 2-prong plug and a 3-prong plug, and the charge-interrupting device plug may comprise a USB connector or a similar type of connector.

In one or more embodiments, the charge-interrupting device outlet may be configured to receive a USB connector, and the charge-interrupting device plug may comprise a USB connector.

The charge-interrupting device may comprise a single unit. In other embodiments, the charge-interrupting device may comprise a modular unit. The modular unit may comprise a base module, and one or more additional modules. In one or more embodiments, the one or more additional modules may comprise at least one of: a voltage converter for stepping up the device for use with a 220 volt power source, a voltage converter for stepping down the device for use with a 110 volt power source, an adapter providing a USB output, and an adapter receiving a USB input or other input and output.

One or more embodiments of the invention comprise a method for interrupting the charging status of a rechargeable battery. The charge-interrupting method may involve disposing a power controlling device in electrical communication with a power source; disposing the rechargeable battery in electrical communication with the power controlling device; and changing the switch state.

The power controlling device may comprise one or more embodiments of the charge-interrupting device described above.

The method may further involve providing instructions to the timer. The instructions may correspond to the duration of time between the timer receiving the instructions and the timer transmitting a signal to the controller, triggering a change of the switch state instantly or after a previously specified time delay.

The step of providing instructions to the timer may further involve determining a time value for the rechargeable battery to be in either a charging state or a discharging state The method may further involve storing charge behavior data of the rechargeable battery. By storing charge behavior data, a time value may be determined by gauging the charge level of the rechargeable battery; reading stored charge behavior data; and extrapolating, based on the charge level and the charge behavior data, the approximate amount of time the rechargeable battery must be in either a charging state or a discharging state to reach a predetermined modified charge level.

The power controlling device may further be configured to be selectively used with either a 110 volt power source or a 220 volt power source. The method may further involve stepping up the power controlling device for use with a 220 volt power source and/or stepping down the power controlling device for use with a 110 volt power source.

DETAILED DESCRIPTION OF THE INVENTION

Embodiments of the invention generally relate to devices and methods for optimizing rechargeable battery life.

Conventional devices used to charge rechargeable batteries (hereinafter also referred to as "chargers," "battery chargers," or "power adaptors") typically continue to provide a flow of electricity from a power source to the batteries after the batteries are fully charged. Such use may potentially damage a battery or reduce its lifespan at an abnormally fast rate.

Existing "smart chargers" have the capability of detecting when a rechargeable battery is fully charged, thereby determining when to stop charging the battery. The mechanism by which a smart charger makes this determination depends on the type of rechargeable battery with which the smart charger is being used. "Smart batteries" include a chip or other internal circuitry that may communicate certain battery characteristics to a smart charger. "Dumb batteries," on the other hand, lack the internal circuitry to provide such information in a manner similar to that of smart batteries. Some smart chargers, however, are capable of monitoring certain characteristics of dumb batteries, e.g., voltage, in order to determine when the battery is fully charged.

Modern "eco-friendly" battery chargers are designed to conserve energy by detecting when a battery is fully charged, thereby determining when the battery charger, not only the battery, should stop drawing power from the power source.

On information and belief, the above-described devices (comprising the status quo of charger technology, i.e., those devices referred to as "conventional," "existing," and "modern") lack the ability to interrupt the charging status of a rechargeable battery bi-directionally. In other words, the above-described devices lack the ability to change the charge status of a battery from a non-charging state to a charging state, and vice-versa, upon one or more time-based trigger events, such as the amount of time charging the rechargeable battery, and amount of time allowing the rechargeable battery to discharge.

Figure 1:
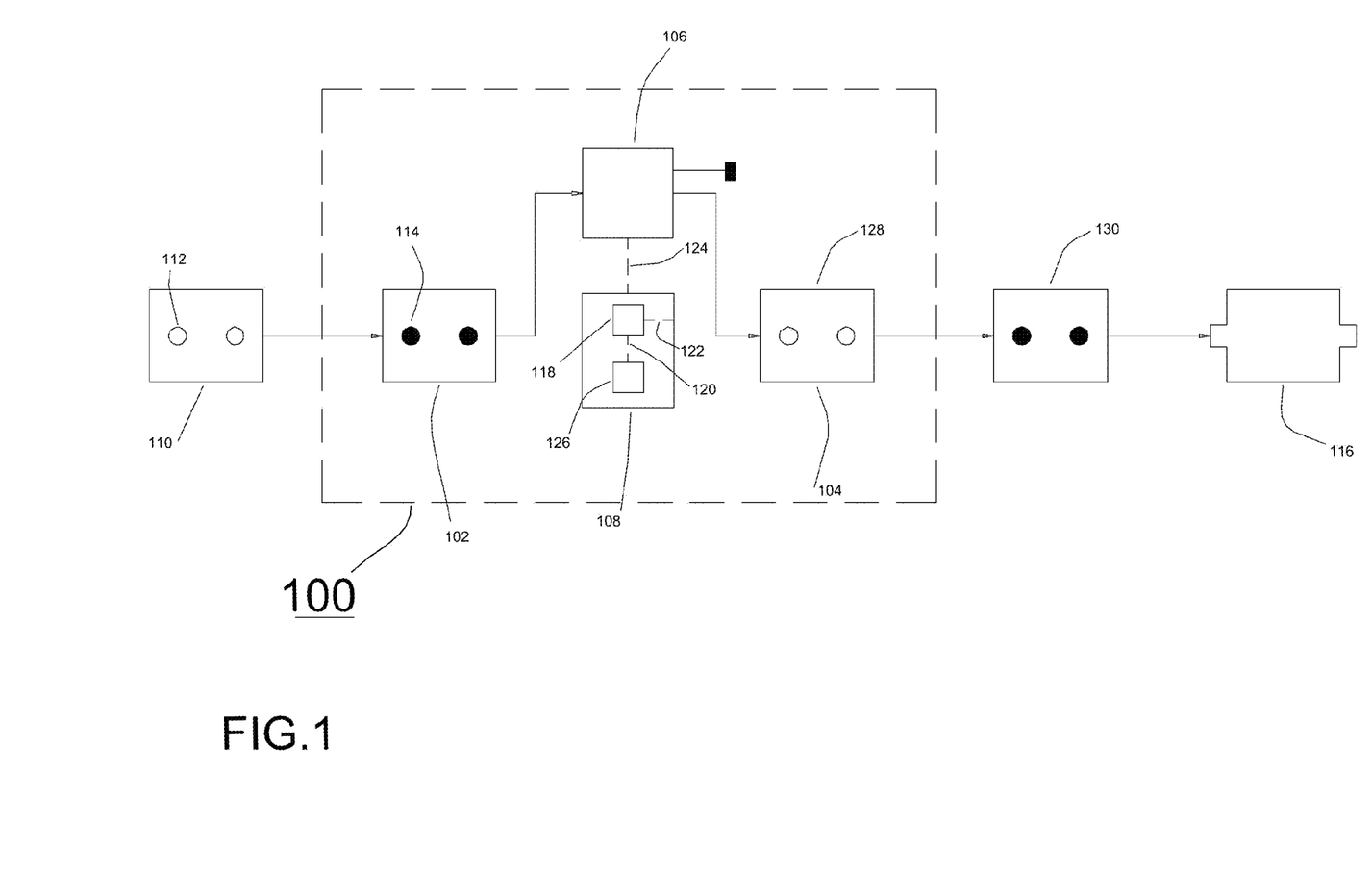
FIG. 1 depicts a schematic of a device for interrupting the charging status of a rechargeable battery in accordance with one or more embodiments of the invention.

FIG. 1 depicts a schematic of a device 100 for interrupting the charging status of a rechargeable battery 116 in accordance with one or more embodiments of the invention. The charge-interrupting device 100 may comprise a plug 102, an outlet 104, a switch 106, and a controller 108.

The charge-interrupting device 100 may be placed in electrical communication with a power source 110. For example, the device 100 may be connected to an alternating current (AC) or direct current (DC) socket, outlet, receptacle, or power point (hereinafter these may be collectively referred to as "socket" to generally describe a type of power source 110 comprising one or more female contacts 112 capable of being placed in electrical communication with one or more male contacts 114 of the plug 102). In one or more embodiments, a user may insert the plug 102 of the charge-interrupting device 100 into a North American standard 120V AC socket. One or more embodiments of the charge-interrupting device 100 may require that the male contact(s) 114 and corresponding female contact(s) 112 are disposed in one or more specific orientations in order for the plug 102 to be accepted by the socket.

One or more embodiments of the charge-interrupting device 100 may comprise a plug 102 adapted for placement in electrical communication with any other type of power source 110 suitable for charging a rechargeable battery 116. A non-exhaustive list of types of power sources 110 may further comprise an automotive socket or a USB port (for devices having rechargeable batteries 116 charged by connection to the USB port of a computer). Further, the plug 102 may be adapted for use in connection with various power sources 110 in compliance with international standards, which may vary by geographic location with respect to one or more of the following parameters: voltage and current rating, shape, and size.

In one or more aspects, the charge-interrupting device 100 may comprise a socket adaptor (not shown) to adapt a first type of socket to a desired second type of socket. For example, the socket adaptor may adapt a North American standard 120V AC socket to a USB port.

As described above with reference to FIG. 1, the plug 102 may comprise one or more male contacts 114. Further, in one or more embodiments, the plug 102 and/or the power source 110 may comprise one or more male contacts 114 (e.g., protruding prongs, pins, or blades) and/or one or more female contacts 112 (e.g., holes or slots).

Figure 2:
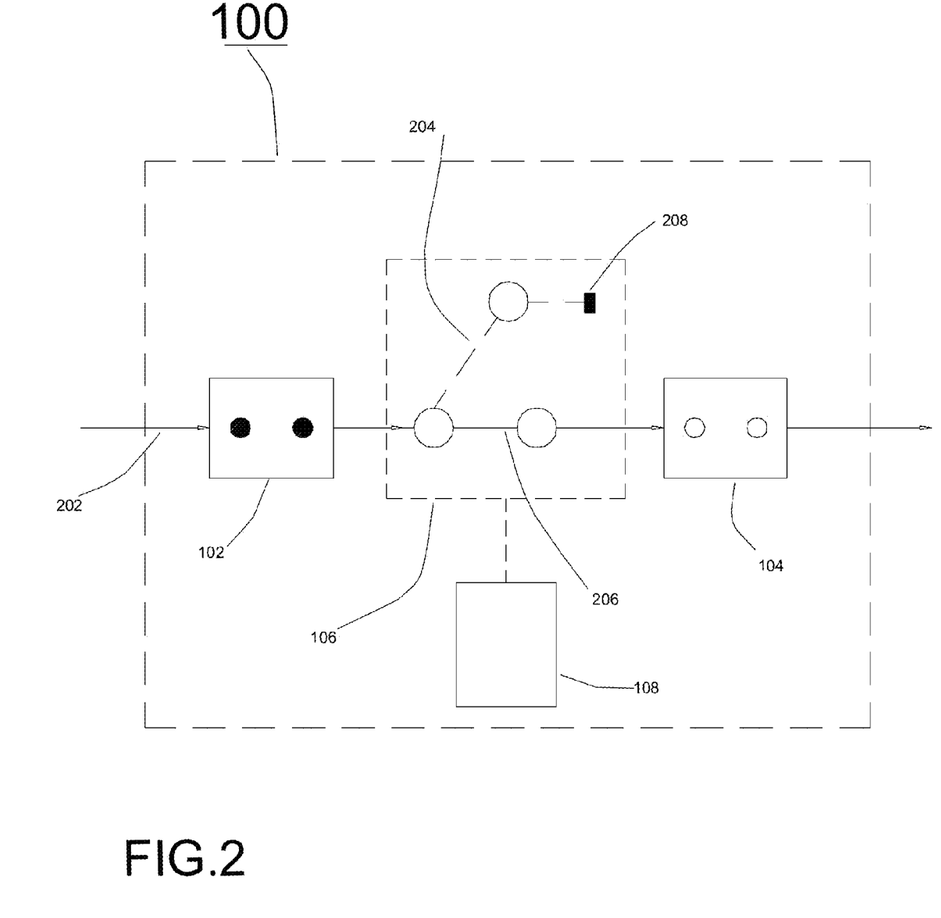
FIG. 2 depicts a schematic detailing a switch of a device for interrupting the charging status of a rechargeable battery in accordance with one or more embodiments of the invention.

The charge-interrupting device 100 may further comprise a switch 106. Now referring to FIGS. 1-2, the switch 106 may be configured to selectively be in either a closed state 206 or an open state 204. The switch state 204, 206 may determine whether the rechargeable battery 116 will be in a charging state (not shown) or a discharging state (not shown). For example, while the switch 106 is in the closed state 206, electricity may flow 202 from the power source 110 to downstream of the switch 106. Conversely, while the switch 106 is in the open state 204, electricity may not flow 208 from the power source 110 to downstream of the switch 106. Because the rechargeable battery 116 may be disposed in electrical communication with, and downstream of the switch 106, the rechargeable battery 116 may charge or discharge depending on whether the switch 106 in a closed state 206 or an open state 204, respectively.

The controller 108 may control the switch state 204, 206, and the switch state 204, 206 may be dependent on at least one of: amount of time the switch is in the open state 204, and amount of time the switch is in the closed state 206. The controller may further comprise a timer 118 to track the amount of time the switch is in the open state 204 and/or the amount of time the switch is in the closed state 206, thereby determining the switch state 204, 206. In one or more aspects, referring to FIG. 3A, the timer 118 may comprise an analog display 318a. In other aspects, referring to FIG. 3B, the timer 118 may comprise a digital display 318b.

Referring now to FIGS. 1-3B, the timer 118 may be configured to receive instructions 120 corresponding to the duration of time between the timer 118 receiving the instructions 120 and the timer 118 producing a signal 122 to the controller 108, the signal 122 triggering 124 a change of the switch state 204, 206 instantly or after a previously specified time delay.

The controller 108 may further comprise an input terminal 126 through which provision of instructions 120 to the timer 118 may be facilitated. In one or more aspects, referring to FIG. 3A, the input terminal 126 may comprise a rotary dial 326a. In other aspects, referring to FIG. 3B, the input terminal 126 may comprise a keypad 326b. However, referring to FIGS. 1-3B, any mechanism suitable for facilitating the provision of instructions 120 to the timer 118 may be used as an input terminal 126. Moreover, the rotary dial 326a, or any other mechanism used as the input terminal 126, may comprise time duration indicia 302.

The charge-interrupting device 100 may further comprise an enclosure 304. The enclosure 304 may house the internal components and/or circuitry of the charge-interrupting device 100, such as the switch 106. The one or more male contacts 114 of the charge-interrupting device may be connected to the enclosure 304. In one or more aspects, the one or more male contacts 114 may be selectively retractable towards the enclosure 304. For example, the one or more male contacts 114 may be retracted towards the enclosure 304 via a pivot and/or a slider mechanism (not shown). The enclosure may comprise a recess (not shown) adapted to receive the one or more male contacts 114 such that, when fully retracted, the one or more male contacts 114 do not protrude from the enclosure 304. When not fully retracted, the one or more male contacts 114 may at least partially protrude from the enclosure 304.

In an additional or alternative aspect, each of the one or more male contacts 114 may be selectively connected or disconnected from an array of connection locations (not shown). The array of connection locations may be configured such that the number and position of the male contacts 114 may be adjusted to suitably complement a particular socket. In one or more embodiments, the one or more male contacts 114 may comprise external threads (not shown) that complement internal threads (not shown) disposed within recesses (not shown) at the connection locations. The male contacts 114 may be easily and quickly screwed into or out of one or more of the recesses. However, any other type of fastening manner suitable for connecting the one or more male contacts 114 to the charge-interrupting device 100 may be used. In this way, among other configuration adjustments, a charge-interrupting device comprising three male contacts 114 may be adjusted to comprise two male contacts 114, and vice-versa.

The outlet 128 of the charge-interrupting device 100 may comprise one or more female contacts 112 for receiving a plug 130 capable of transferring power to a rechargeable battery 116. In one or more embodiments, the outlet 128 may further comprise one or more male contacts 114.

Figure 3A:
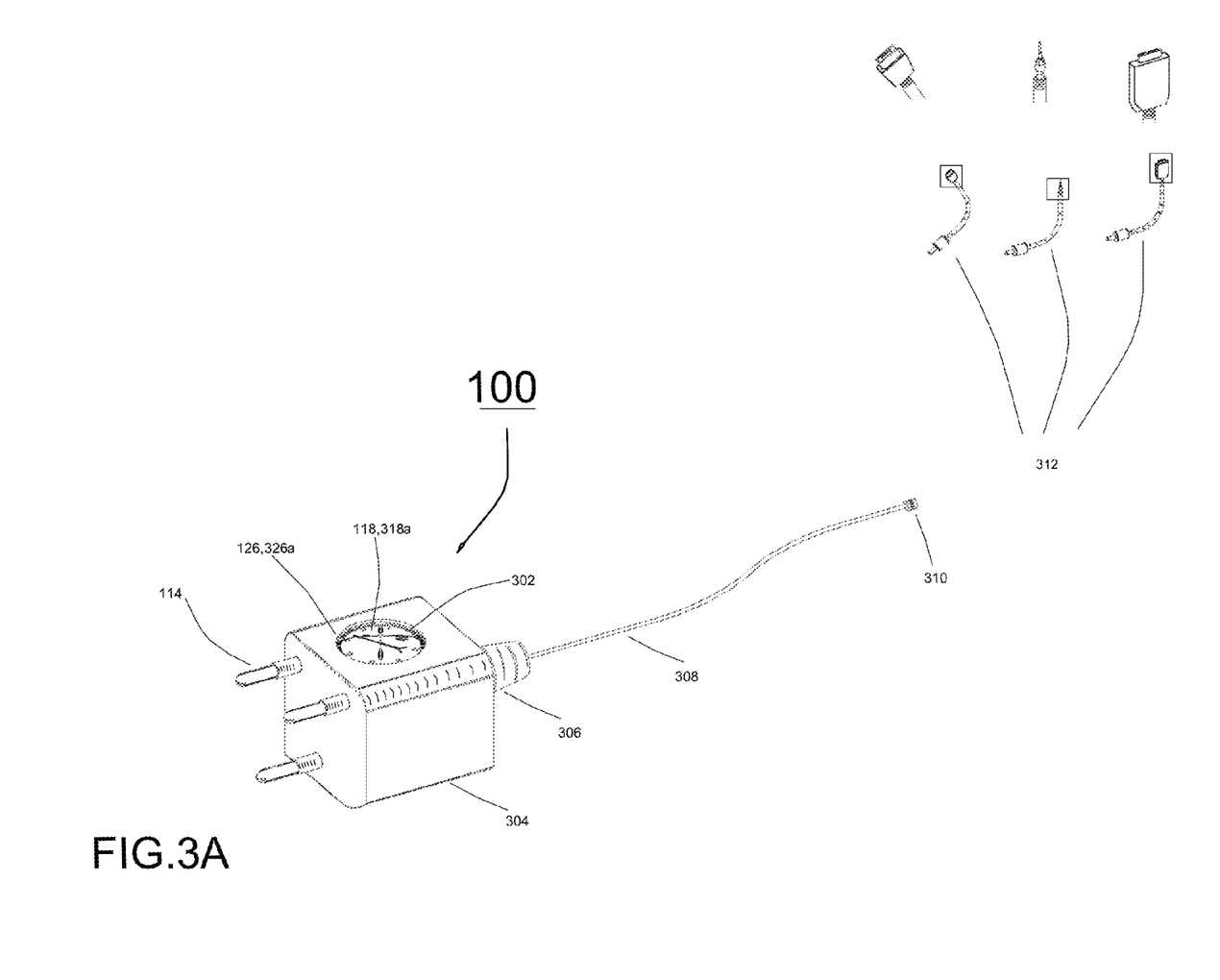
FIGS. 3A-3B each depict a perspective view of a device for interrupting the charging status of a rechargeable battery in accordance with one or more embodiments of the invention.
Figure 3B:
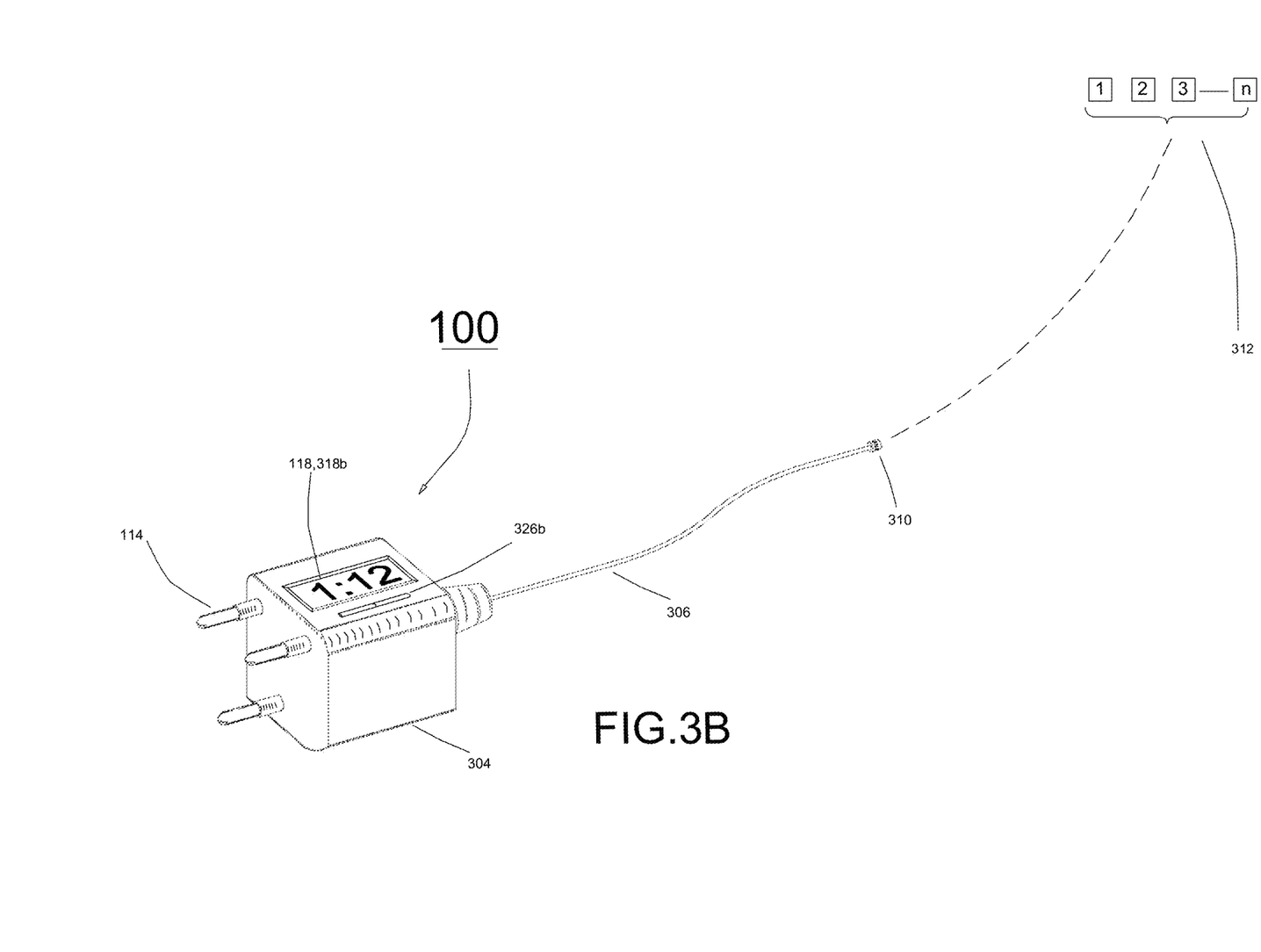

FIGS. 3A-3B illustrate one or more embodiments in which the outlet 128 may receive a plug 130 from a first end 306 of an adaptor 308. The adaptor 308 may have a second end 310 which may be connected directly to a socket 312 intended to be the nearest and/or primary access point for charging the rechargeable battery 116. The socket 312 may be disposed either directly on the rechargeable battery 116 or indirectly on a device carrying the rechargeable battery 116. In one or more embodiments, the second end 310 of the adaptor 308 may connect another adaptor (which, in turn, may be connected to another adaptor, etc.) in series. The one or more other adaptors may be provided as standard or common peripherals with a variety of devices 1, 2, 3, . . . n carrying a rechargeable battery 116. For example, devices 1, 2, 3, . . . n that may carry a rechargeable battery 116 include, but are not limited to, cameras, cell phones, tablet devices, and computers.

In one or more embodiments, the charge-interrupting device 100 may further comprise converter circuitry (not shown) for facilitating use in multiple regions having varying power source voltage and/or frequency standards. For example, the charge-interrupting device 100 may be stepped up from 110V use to 220V use, and vice-versa, without the aid of any additional devices.

In one or more embodiments, the charge-interrupting device 100 may be configured and provided as a single unit. In one or more other embodiments, the charge-interrupting device 100 may be modularly configured, and provided as a base module with additional modules provided separately.

Figure 4:
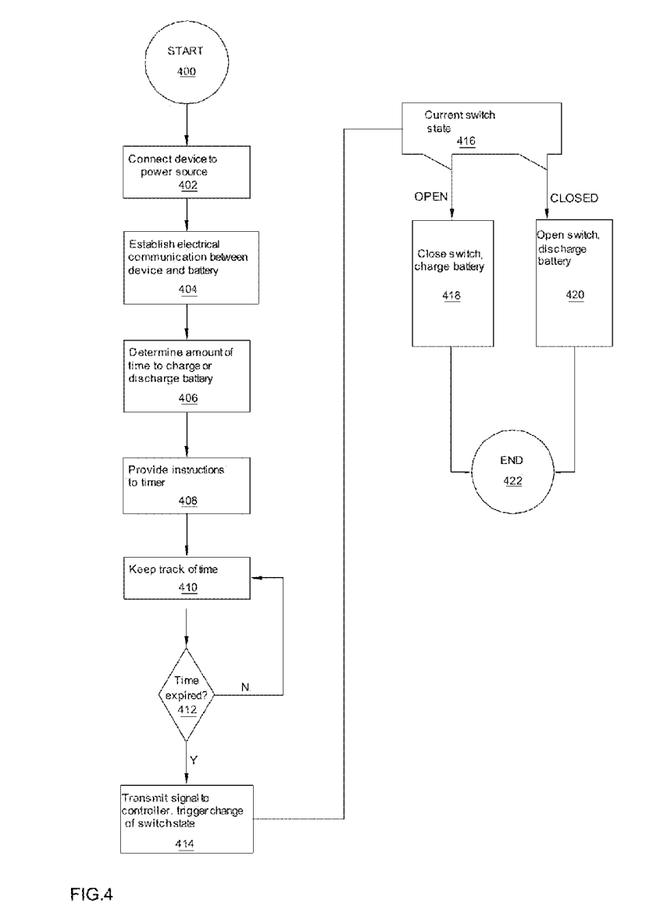
FIG. 4 illustrates a flow diagram of a method in accordance with one or more embodiments of the invention.

One or more embodiments of the invention comprise a method for interrupting the charging status of a rechargeable battery, illustrated in the flow diagram of FIG. 4. The charge-interrupting method 400 may involve disposing a power controlling device in electrical communication with a power source (step 402); disposing the rechargeable battery in electrical communication with the power controlling device (step 404); and changing the switch state (steps 418, 420).

The power controlling device may comprise one or more embodiments of the charge-interrupting device 100 described above.

The method may further involve providing instructions to the timer (step 408). The instructions may correspond to the duration of time (step 406) between the timer receiving the instructions and the timer transmitting a signal to the controller (step 414), triggering a change of the switch state (step 414) instantly or after a previously specified time delay. In other words, the timer may keep track of the expired time (step 412), communicate to the controller upon expiration of the time. The controller determines the current switch state (step 416, which may occur at any point in the flow of the method). If the current switch state is 'open', then the controller closes the switch (step 418), reaching the end of one or more embodiments of the method (step 422). Conversely, if the current switch state is 'closed', then the controller opens the switch (step 402), reaching the end of one or more embodiments of the method (step 422).

The step of providing instructions to the timer may further involve determining a time value (step 406) for the rechargeable battery to be in either a charging state (step 418) or a discharging state (step 420). The charging state (step 418) may correspond to a closed switch state, and the discharging state (step 420) may correspond to an open switch state. The step of providing instructions to the timer (step 408) may further involve interfacing with the input terminal, the input terminal facilitating the provision of the instructions to the timer.

The method may further involve storing charge behavior data of the rechargeable battery. By storing charge behavior data, a time value may be determined by gauging the charge level of the rechargeable battery; reading stored charge behavior data; and extrapolating, based on the charge level and the charge behavior data, the approximate amount of time the rechargeable battery must be in either a charging state or a discharging state to reach a predetermined modified charge level. Gauging the charge level may involve calculating a ratio of the amount of charge remaining in the rechargeable battery to the total charge capacity of the rechargeable battery.

In one or more embodiments of the method, the instructions may also comprise a plurality of instruction sets. The timer may transmit a plurality of signals to the controller in response to the plurality of instructions sets. The plurality of signals transmitted by the timer may trigger a corresponding series of switch state changes.

In one or more aspects, the predetermined modified charge status may comprise a lower charge than the gauged charge level. Alternatively, in one or more other aspects, the predetermined modified charge status may comprise a higher charge than the gauged charge level.

Figure 5A:
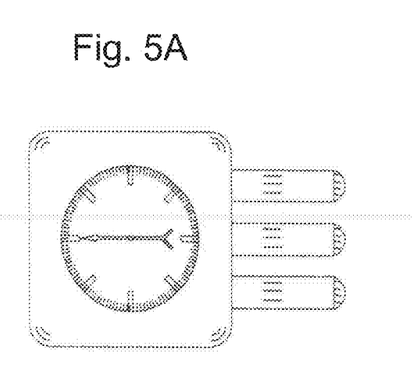
FIGS. 5A-5X are respective top, side, end, and perspective views of an apparatus including a timer for switching off the power to an electrically-operated device in accordance with one or more embodiments of the invention.
Figure 5B:
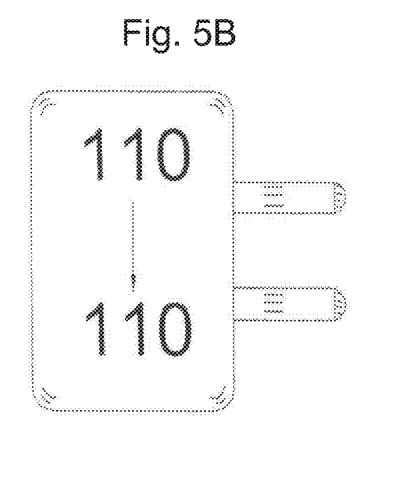
Figure 5C:
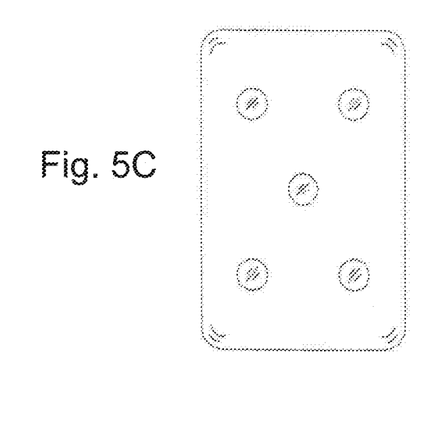
Figure 5D:
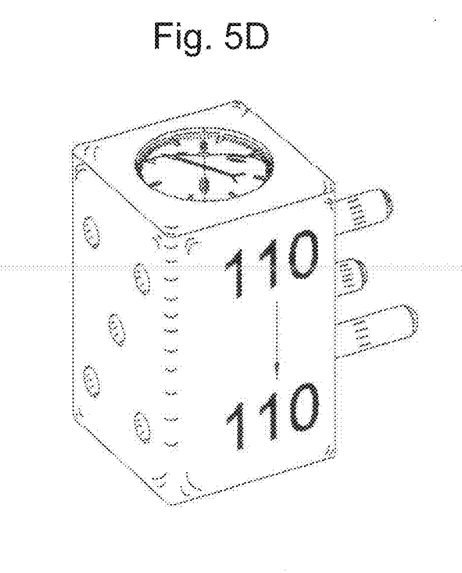
Figure 5E:
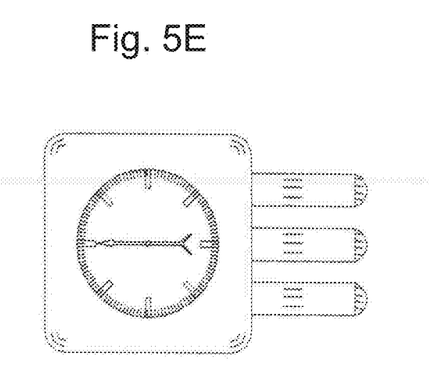
Figure 5F:
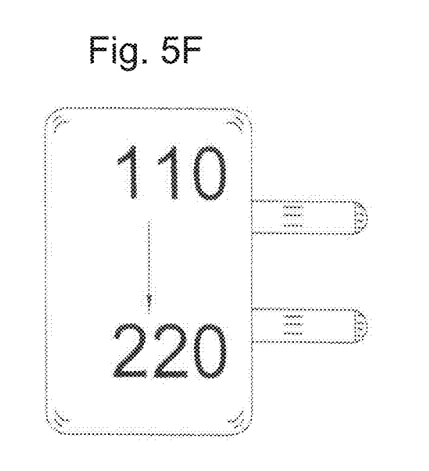
Figure 5G:
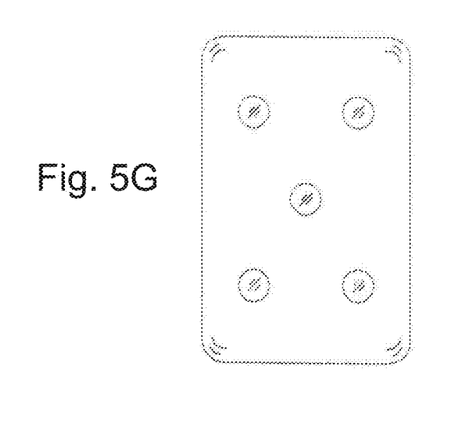
Figure 5H:
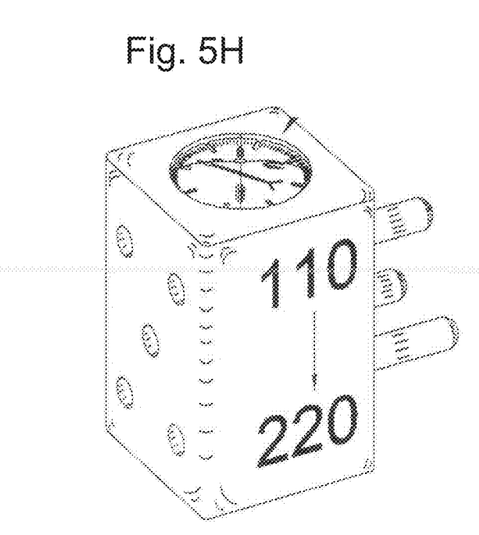
Figure 5I:
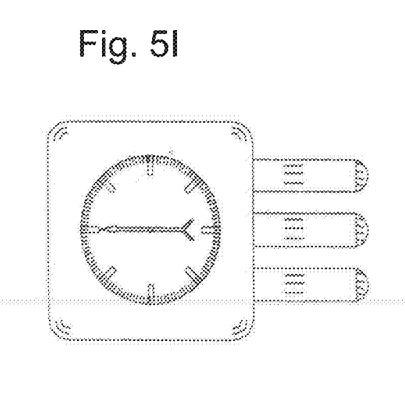
Figure 5J:
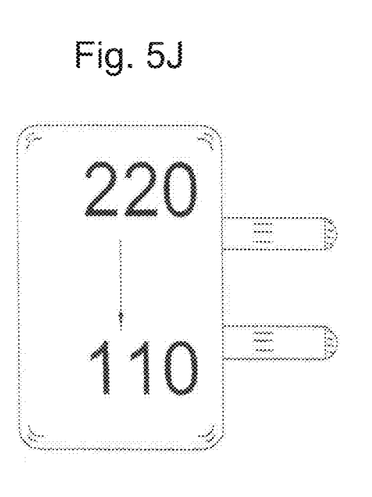
Figure 5K:
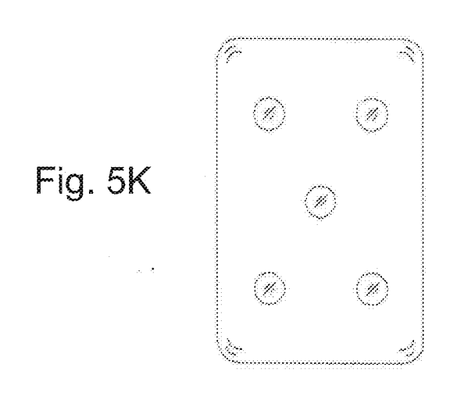
Figure 5L:
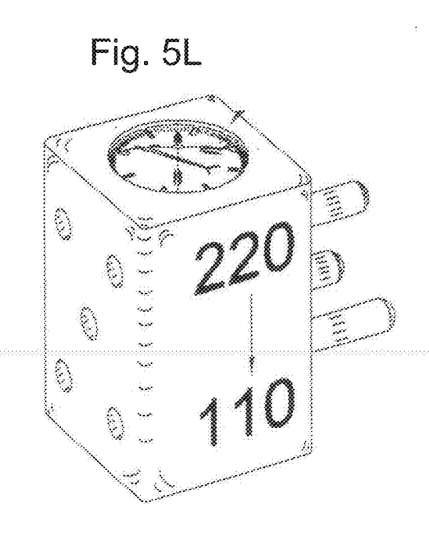
Figure 5M:
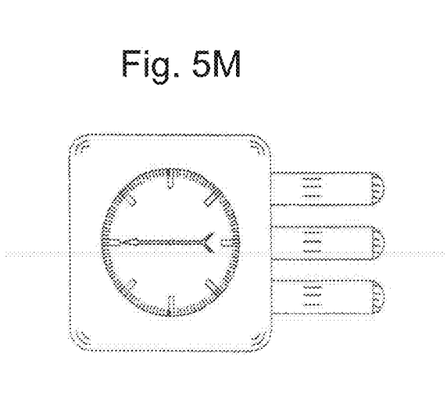
Figure 5N:
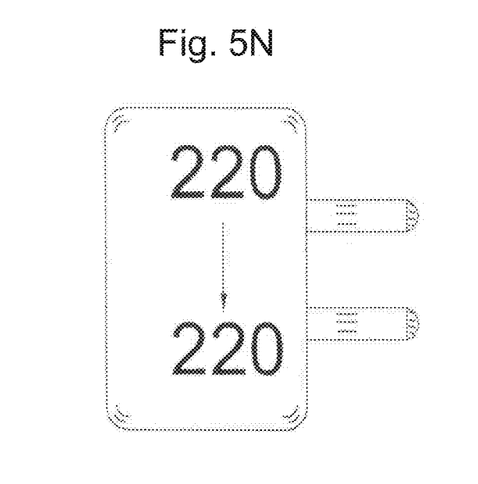
Figure 5O:
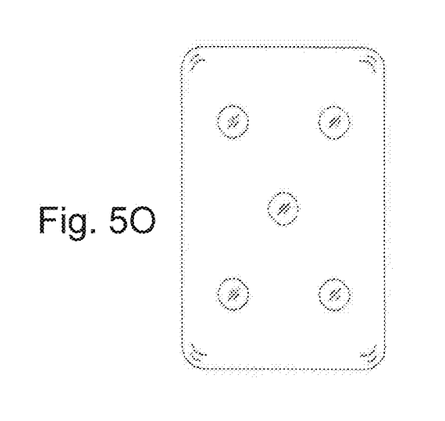
Figure 5P:
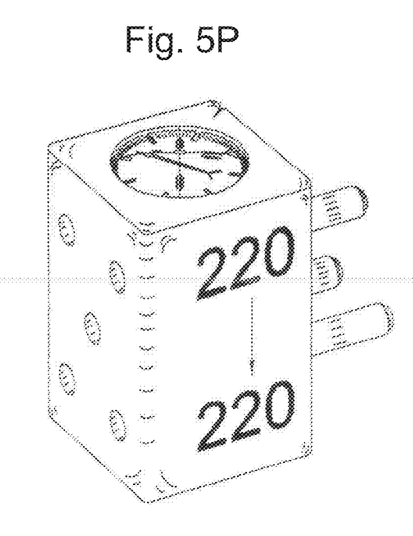
Figure 5Q:
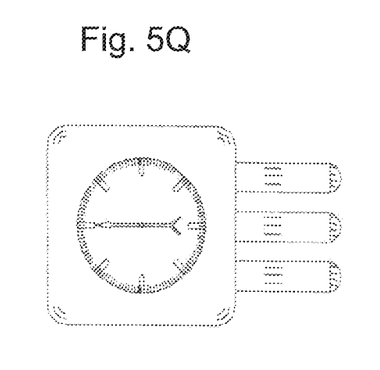
Figure 5R:
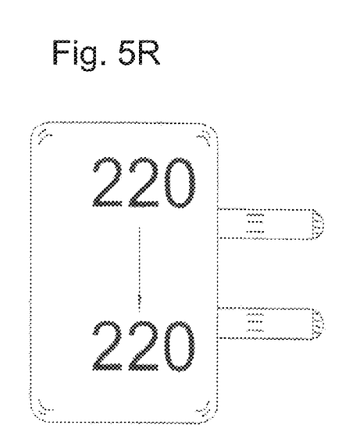
Figure 5S:
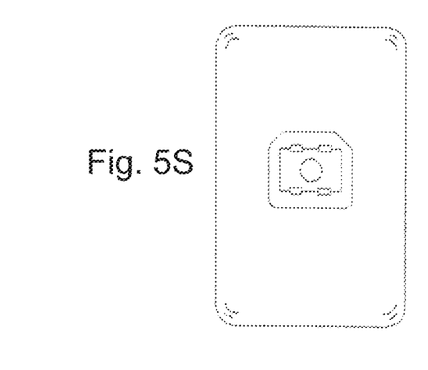
Figure 5T:
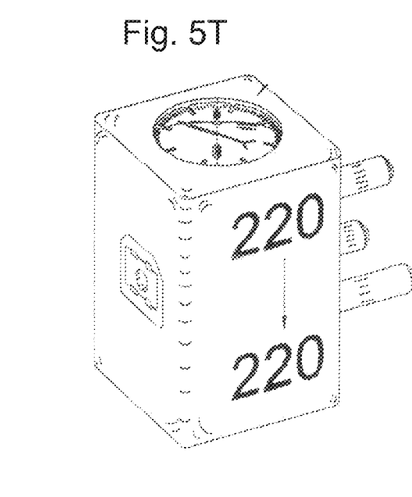
Figure 5U:
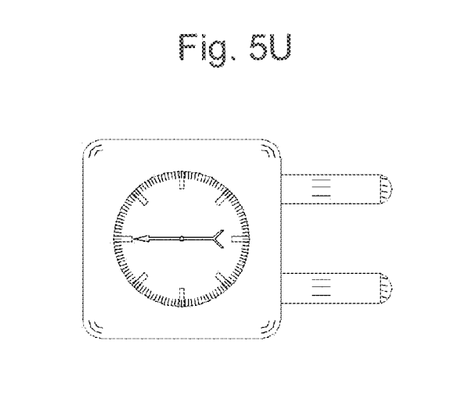
Figure 5V:
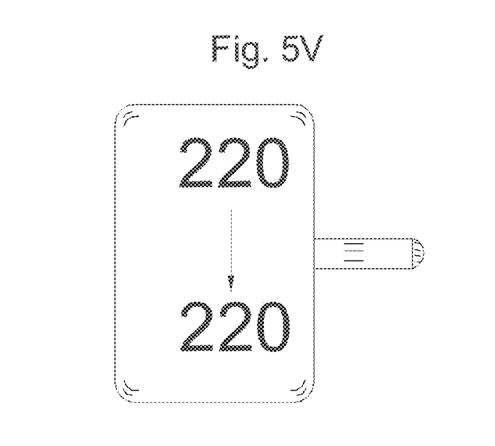
Figure 5W:
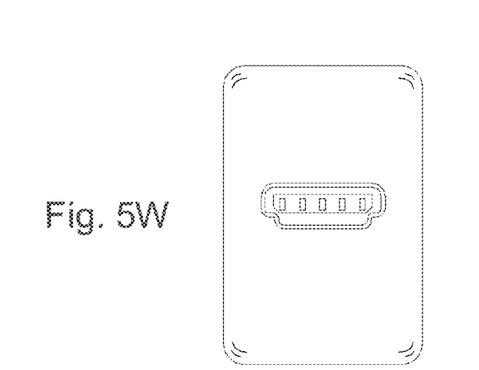
Figure 5X:
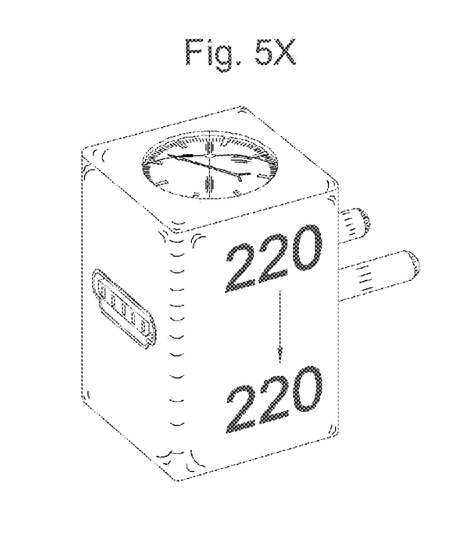
Figure 6:
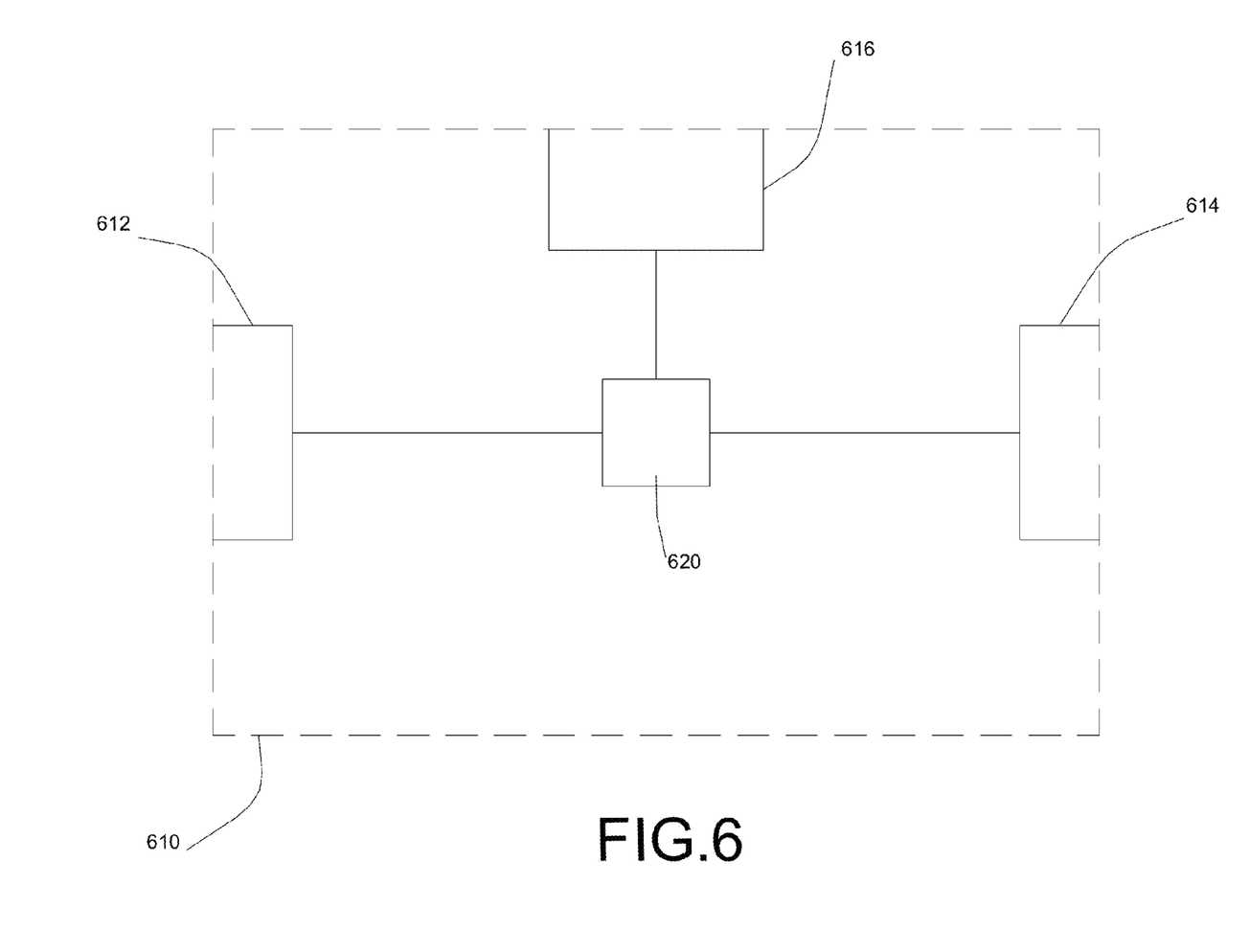
FIG. 6 is a schematic view of the circuitry of the apparatus of FIGS. 5A-5X in accordance with one or more embodiments of the invention.

FIGS. 5A-5T and 6 show an apparatus and a schematic in accordance with one or more embodiments of the invention comprising an enclosure 610 having a three-prong (grounded) plug 612 incorporated therein that is plugged by the user into a standard 120V AC power outlet. Although illustrated as being adapted for plugging into a 120V AC outlet, those skilled in the art will recognize that the enclosure 610 may also be adapted for plugging into other types of power outlets such as a 12V DC automotive power outlet and/or into a USB port (for devices that are charged by connection to the powered USB port of a computer), or that it may be manufactured with multiple plugs and/or internal circuitry as known in the art so that it is capable of being plugged into more than one type of power outlet such that the particular enclosure shown herein should not be construed as limiting the invention to any particular type of power source or plug. For example, the embodiment of the apparatus illustrated in FIGS. 5U-5X comprises a two-prong plug rather than a three-prong plug.

In the particular embodiment shown, the enclosure 610 is provided with an outlet 614 for accepting the plug from the battery charger or from the device incorporating a rechargeable battery (not shown). For recharging the battery of, for instance, a cordless drill or screwdriver, the outlet 614 receives the 110V AC power cable of the battery charger. If the device is, for instance, a cell phone, so-called e-Reader, or portable music or video player, the outlet 614 may be a plug for receiving the USB cable, as shown in the embodiment of FIGS. 5U-5X. A user-set timer 616 is provided that switches power to the outlet 614 off so that, at the conclusion of the time set on timer 616, the rechargeable device or battery charger is disconnected from the power by circuitry (see FIG. 6) contained within enclosure 610 so that battery charging stops. Those skilled in the art who have the benefit of this disclosure will recognize that timer 616 is not the only way to accomplish the goal of disconnecting the device or the charger from the power. In one or more embodiments (not shown), the enclosure 610 is provided with a switch that, when activated, commences a 15 minute (or 30, 45, 60, . . . n minute, or other interval as selected by the user) period before power to outlet 614 is switched off so that the device or charger is disconnected from the power source by the circuitry contained within enclosure 610. In one or more embodiments, or alternatively, circuitry is provided for detecting the "charged" or "charge complete" message, light, or other indicator from the charger, the battery, or the device being charged and, upon detecting that signal, switching off the power to outlet 614.

Referring now to FIG. 6, showing a schematic view of the circuitry within enclosure 610, when plug 612 is connected to a power source, the plug to a battery charger (not shown) is plugged into the outlet 614 of enclosure 610. When the time set on timer 616 is reached, timer 616 outputs a signal that activates the relay 620, switching off the power supplied to outlet 614.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

I claim:

1. A device for interrupting the charging status of a rechargeable battery, comprising:
   a plug for connecting to a power source;
   an outlet for receiving a plug capable of transferring power to the rechargeable battery;
   a switch configured to selectively be in either a closed state or an open state, wherein, the closed state corresponds to a charging state, the open state corresponds to a discharging state, and wherein-while the switch is in the closed state, electricity flows from the power source to downstream of the switch; and while the switch is in the open state, electricity does not flow from the power source to downstream of the switch; and
   a controller for controlling the charging state of the switch or the discharging state of the switch for reaching a predetermined modified charge level in the rechargeable battery,
   wherein an approximate amount of time the rechargeable battery must be either in the charging state or in the discharging state to reach to the predetermined modified charge level is determined by:
   gauging the charge level of the rechargeable battery;
   reading stored charge behavior data of the rechargeable battery; and
   extrapolating based on the charge level and the charge behavior data.

2. The device of claim 1, further comprising an enclosure, the plug connected to the enclosure.

3. The device of claim 1, the plug selectively retractable towards the enclosure.

4. The device of claim 2, the outlet comprising one or more female contacts configured to receive a plug comprising one or more male contacts.

5. The device of claim 1, the controller controls the charging state of the switch or the discharging state of the switch based on the predetermined modified charge level in the rechargeable battery, wherein the predetermined modified charge level comprises one of a lower charge than the gauged charge level and higher charge level than the gauged charge level.

6. The device of claim 1, the controller further comprising a timer for determining the switch state, the timer configured to receive instructions corresponding to the duration of time between receiving the instructions and producing a signal to the controller, the signal triggering a change of the switch state instantly or after a previously specified time delay.

7. The device of claim 6, the timer comprising an analog display.

8. The device of claim 6, the timer comprising a digital display.

9. The device of claim 6, the controller further comprising an input terminal, the input terminal facilitating provision of the instructions to the timer.

10. The device of claim 9, the input terminal comprising a keypad.

11. The device of claim 9, the input terminal comprising a rotary dial.

12. The device of claim 11, the rotary dial comprising time duration indicia.

13. The device of claim 1, the device outlet configured to receive a plug type comprising at least one of: 2-prong plug, 3-prong plug, USB connector, micro USB connector, 30-pin connector or similar plug type.

14. The device of claim 1, the device plug comprising at least one of: 2-prong plug, 3-prong plug, USB connector, micro USB connector, and 30-pin connector.

15. The device of claim 1, the device outlet configured to receive a USB connector, and the device plug comprising at least one of a 2-prong plug and a 3-prong plug.

16. The device of claim 1, the device outlet configured to receive a USB connector, and the device plug comprising a USB connector or similar connector.

17. The device of claim 1, the device outlet configured to receive at least one of a 2-prong plug and a 3-prong plug, the device plug comprising a USB connector or similar connector.

18. The device of claim 1, wherein the device comprises a single unit.

19. The device of claim 1, the device comprising a modular unit, the modular unit comprising a base module and one or more additional modules.

20. The device of claim 19, the one or more additional modules comprising at least one of:
- a voltage converter for stepping up the device for use with a 220 volt power source,
- a voltage converter for stepping down the device for use with a 110 volt power source,
- an adapter providing a USB output, and
- an adapter receiving a USB input or other input and output.

21. A method for interrupting the charging status of a rechargeable battery, comprising:
disposing a power controlling device in electrical communication with a power source, the power controlling device comprising:
a switch configured to selectively be in either a closed state or an open state, wherein:
while the switch is in the closed state, electricity flows from the power source to downstream of the switch; and
while the switch is in the open state, electricity does not flow from the power source to downstream of the switch; and
a controller for controlling the charging state of the switch or the discharging state of the switch switch is in the open state, and amount of time the switch is in the closed state for reaching a predetermined modified charge level in the rechargeable battery,
wherein an approximate amount of time the rechargeable battery must be either in the charging state or in the discharging state to reach to the predetermined modified charge level is determined by:
gauging the charge level of the rechargeable battery;
reading stored charge behavior data of the rechargeable battery; and
extrapolating based on the charge level and the charge behavior data,
the controller comprising a timer capable of transmitting a signal, the signal triggering a change of the switch state instantly or after a previously specified time delay; and
disposing the rechargeable battery in electrical communication with the power controlling device until the rechargeable battery reaches the predetermined modified charge level.

22. The method of claim 21, further comprising providing instructions to the timer, the instructions corresponding to the duration of time between the timer receiving the instructions and the timer transmitting a signal to the controller, the signal triggering a change of the switch state instantly or after a previously specified time delay.

23. The method of claim 22, the controller further comprising an input terminal, the providing the instructions to the timer comprising: determining a time value for the rechargeable battery to be in either a charging state or a discharging state, the charging state corresponding to the closed switch state, and the discharging state corresponding to the open switch state; interfacing with the input terminal, the input terminal facilitating the provision of the instructions to the timer.

24. The method of claim 21, the instructions comprising a plurality of instruction sets, the timer transmitting a plurality of signals in response to the plurality of instruction sets, the plurality of signals triggering a corresponding series of switch state changes.

25. The method of claim 21, wherein the power controlling device is configured to be selectively used with either a 110 volt power source or a 220 volt power source.

26. The method of claim 25, further comprising stepping up the power controlling device for use with a 220 volt power source.

27. The method of claim 25, further comprising stepping down the power controlling device for use with a 110 volt power source.

28. The method of claim 21, the gauging the charge level comprising calculating a ratio of the amount of charge remaining in the rechargeable battery to the total charge capacity of the rechargeable battery.

* * * * *